United States Patent
Estee

(10) Patent No.: US 10,609,121 B2
(45) Date of Patent: *Mar. 31, 2020

(54) APPLICATION-SPECIFIC GROUP LISTING

(71) Applicant: Apple Inc., Cupertino, CA (US)

(72) Inventor: Mike Estee, San Francisco, CA (US)

(73) Assignee: Apple Inc., Cupertino, CA (US)

(*) Notice: Subject to any disclaimer, the term of this patent is extended or adjusted under 35 U.S.C. 154(b) by 480 days.

This patent is subject to a terminal disclaimer.

(21) Appl. No.: 14/562,509

(22) Filed: Dec. 5, 2014

(65) Prior Publication Data

US 2015/0088961 A1     Mar. 26, 2015

Related U.S. Application Data

(63) Continuation of application No. 13/527,285, filed on Jun. 19, 2012, now abandoned, which is a continuation of application No. 10/840,783, filed on May 6, 2004, now Pat. No. 8,209,376.

(51) Int. Cl.
*G06F 9/54* (2006.01)
*H04L 29/08* (2006.01)

(52) U.S. Cl.
CPC ............... *H04L 67/10* (2013.01); *G06F 9/54* (2013.01)

(58) Field of Classification Search
CPC ....... H04M 3/42; H04L 51/046; G06Q 10/10; G06Q 10/109
See application file for complete search history.

(56) References Cited

U.S. PATENT DOCUMENTS

| | | | |
|---|---|---|---|
| 4,107,784 A | 8/1978 | Van | |
| 4,433,377 A | 2/1984 | Eustis | |
| 4,485,439 A | 11/1984 | Rothstein | |
| 4,513,379 A | 4/1985 | Wilson | |
| 4,555,775 A | 11/1985 | Pike | |
| 4,586,158 A | 4/1986 | Brandle | |
| 4,642,790 A | 2/1987 | Minshull | |
| 5,617,539 A | 4/1997 | Ludwig | |
| 5,758,079 A | 5/1998 | Ludwig | |
| 5,854,893 A | 12/1998 | Ludwig | |
| 5,867,281 A | 2/1999 | Nozoe | |
| 5,884,039 A | 3/1999 | Ludwig | |
| 5,896,500 A | 4/1999 | Ludwig | |
| 6,237,025 B1 | 5/2001 | Ludwig | |

(Continued)

OTHER PUBLICATIONS

Betts, B., et al.; Goals and Objectives for User Interface Software; Computer Graphics, vol. 21, No. 2, (Apr. 1987) pp. 73-78.
Bleher, J.H., et al.; A Graphic Interactive Application Monitor; IBM Syst. J., vol. 19, No. 3 (1980) pp. 382-402 [this reference can be found in the file history in commonly-assigned U.S. Appl. No. 10/840,783, now U.S. Appl. No. 8,209,367].
Borenstein, Nathaniel S.; Information Technology Center and Computer Science Department, Carnegie Mellon University; Thyberg, Chris A. Academic Computing, Carnegie Mellon University: Cooperative Work in the Andrew Message System; (1988) pp. 306-323.
Conklin, Jeffrey; A Survey of Hypertext; MCC Software Technology Program (Dec. 1987); pp. 1-38.

(Continued)

*Primary Examiner* — Li P Sun
*Assistant Examiner* — Qi Wan
(74) *Attorney, Agent, or Firm* — Blank Rome LLP

(57) ABSTRACT

A method, apparatus, and system for providing active contents between applications activated by a plurality of computer systems are provided. A list of one or more remote users is created. A determination is made whether a first application and a second application are being executed by the at least one or more remote users. The list is updated in response to determining a change in a status of the second application being executed by the one or more remote users using at least one communications feature associated with the first application.

13 Claims, 10 Drawing Sheets

(56) References Cited

U.S. PATENT DOCUMENTS

| | | | |
|---|---|---|---|
| 6,349,327 B1* | 2/2002 | Tang | G06F 9/54 709/201 |
| 6,351,762 B1 | 2/2002 | Ludwig | |
| 6,381,218 B1* | 4/2002 | McIntyre | G06F 11/3006 370/216 |
| 6,437,818 B1 | 8/2002 | Ludwig | |
| 6,583,806 B2 | 6/2003 | Ludwig | |
| 6,594,688 B2 | 7/2003 | Ludwig | |
| 6,735,615 B1 | 5/2004 | Iwayama | |
| 6,750,881 B1 | 6/2004 | Appelman | |
| 7,035,653 B2 | 4/2006 | Simon | |
| 7,051,012 B2 | 5/2006 | Cole | |
| 7,056,217 B1 | 6/2006 | Pelkey | |
| 7,080,139 B1* | 7/2006 | Briggs | G06Q 30/02 707/999.003 |
| 7,139,796 B2 | 11/2006 | Rekimoto | |
| 7,152,093 B2 | 12/2006 | Ludwig | |
| 7,206,809 B2 | 4/2007 | Ludwig | |
| 7,269,787 B2 | 9/2007 | Amitay | |
| 7,283,805 B2 | 10/2007 | Agrawal | |
| 7,395,319 B2 | 7/2008 | Harris | |
| 7,412,470 B2 | 8/2008 | Masuno | |
| 7,433,921 B2 | 10/2008 | Ludwig | |
| 7,519,667 B1* | 4/2009 | Capps | H04L 51/046 709/203 |
| 7,853,786 B1 | 12/2010 | Fultz | |
| 2001/0024951 A1* | 9/2001 | Rignell | H04M 3/42 455/414.2 |
| 2002/0049751 A1 | 4/2002 | Chen | |
| 2002/0076025 A1* | 6/2002 | Liversidge | G06Q 10/10 379/202.01 |
| 2002/0198880 A1* | 12/2002 | Ullmann | G06F 17/30348 |
| 2003/0074253 A1 | 4/2003 | Scheuring | |
| 2003/0158902 A1 | 8/2003 | Volach | |
| 2004/0153506 A1 | 8/2004 | Ito | |
| 2004/0199663 A1 | 10/2004 | Horvitz | |
| 2004/0223485 A1 | 11/2004 | Arellano | |
| 2005/0165880 A1* | 7/2005 | Moody | G06Q 10/10 709/200 |
| 2005/0187912 A1 | 8/2005 | Matsa | |
| 2005/0235035 A1* | 10/2005 | Benejam | G06Q 10/109 709/206 |
| 2005/0235038 A1 | 10/2005 | Donatella | |

OTHER PUBLICATIONS

Croft, W. Bruce and Lefkowitz, Lawrence S.; Task Support in an Office System; Computer and Information Science Department, University of Massachusetts, (1984) pp. 22-24.

Donahue, James; Widom, Jennifer; Whiteboards: A Graphical Database Tool; ACM Transactions on Office Information Systems, vol. 4, No. 1, Jan. 1986, pp. 24-41 [this reference ca be found in the file history in commonly-assigned U.S. Appl. No. 10/840,783, now U.S. Appl. No. 8,209,367].

Fisher, S.S., et al.; Virtual Environment Display System; Interactive 3D Graphics (Oct. 23-24, 1986) pp. 77-87.

Gardner, P.C.; A System for the Automated Office Environment; IBM Syst. J., vol. 20, No. 3, (1981) pp. 321-345 [this reference ca be found in the file history in commonly-assigned U.S. Appl. No. 10/840,783, now U.S. Appl. No. 8,209,367].

Good, Michael D., et al.; Building a User-Derived Interface; Communications of the ACM; (Oct. 1984) vol. 27, No. 10; pp. 1032-1043 [this reference ca be found in the file history in commonly-assigned U.S. Appl. No. 10/840,783, now U.S. Appl. No. 8,209,367].

Gruhn, A.M. and Hohl, A.C.; A Research Perspective on Computer-Assisted Office Work; (1979) IBM Syst. J. vol. 18, No. 3, pp. 432-456 [this reference ca be found in the file history in commonly-assigned U.S. Appl. No. 10/840,783, now U.S. Appl. No. 8,209,367].

Halbert, D.C.; Programming by Example; Dept. Electrical Engineering and Comp. Sciences, University of California, Berkley, (Nov. 1984) pp. 1-76.

Hill, R.D.; Some Important Features and Issues in User Interface Management System; Dynamic Graphics Project, University of Toronto, CSRI, vol. 21, No. 2 (Apr. 1987); pp. 116-120 [this reference ca be found in the file history in commonly-assigned U.S. Appl. No. 10/840,783, now U.S. Appl. No. 8,209,367].

Howard, John H.; "An Overview of the Andrew File System"; Information Technology Center, Carnegie Mellon University; (CMU-ITC-88-062); pp. 1-6 (CMU-ITC-88062); Date Unknown.

Meyer, Mike; (Abstract) A Shell for Modern Personal Computers; University of California; pp. 13-19; 1987.

Meyrowitz, Norman; Moser, Margaret; Bruwin: An Adaptable Design Strategy for Window Manager/Virtual Terminal Systems; Department of Computer Science, Brown University (1981); pp. 180-189 [this reference ca be found in the file history in commonly-assigned U.S. Appl. No. 10/840,783, now U.S. Appl. No. 8,209,367].

Morland, D. Verne; Human Factors Guidelines for Terminal Interface Design; Communications of the ACM (Jul. 1983) vol. 26, No. 7, pp. 484-494 [this reference ca be found in the file history in commonly-assigned U.S. Appl. No. 10/840,783, now U.S. Appl. No. 8,209,367].

Morris, James H. et al.; Andrew: A Distributed Personal Computing Environment; Communications of the ACM,( Mar. 1986); vol. 29 No. 3, pp. 184-201.

Palay, Andrew J., et al.; The Andrew Toolkit: An Overview; Information Technology Center, Carnegie-Mellon University; pp. 1-15; Date Unknown.

Raper, Larry K., The C-MU PC Server Project (Dec. 1986) pp. 1-30 (CMU-ITC-86-051).

Rosenberg, J. et al.; An Overview of the Andrew Message System; Information Technology Center Carnegie-Mellon University; (Jul. 1987); pp. 99-108.

Scheifler, R.W.; The X Window System; MIT Laboratory for Computer Science and Gettys, Jim Digital Equipment Corporation and MIT Project Athena; ACM Transactions on Graphics, vol. 5, No. 2, Apr. 1986, pp. 79-109 [this reference ca be found in the file history in commonly-assigned U.S. Appl. No. 10/840,783, now U.S. Appl. No. 8,209,367].

Smith, Sidney L. and Mosier, Jane D.; Guidelines for Designing User Interface Software; UserLab, Inc. (Aug. 1986); pp. 1-384 [this reference ca be found in the file history in commonly-assigned U.S. Appl. No. 10/840,783, now U.S. Appl. No. 8,209,367].

Trigg, R.H. and Irish, P.M.; Hypertext Habitats: Experiences of Writers in NoteCards; Hypertext '87 Papers; Intelligent Systems Laboratory, Xerox Palo Alto Research Center; pp. 89-108 [a copy of this reference ca be found in the file history in commonly-assigned U.S. Apl. No. 10/840,783, now U.S. Appl. No. 8,209,367].

Trowbridge, David; Using Andrew for Development of Educational Applications; Center for Design of Educational Computing, Carnegie-Mellon University; pp. 1-6; Jun. 2, 1985; (CMU-ITC-85-065); Jun. 2, 1985.

Wadlow, M.G.; The Role of Human Interface Guidelines in the Design of Multimedia Applications, Carnegie Mellon University (To be Published in Current Psychology: Research and Reviews, Summer 1990) pp. 1-22 (CMU-ITC-91-101) [this reference ca be found in the file history in commonly-assigned U.S. Appl. No. 10/840,783, now U.S. Appl. No. 8,209,367].

Walker, B., et al.; The LOCUS Distributed Operating System; University of California Los Angeles (1983) pp. 49-70.

Ziegler, K., Jr.; A Distributed Information System Study; IBM Syst. J., vol. 18, No. 3 (1979) [this reference ca be found in the file history in commonly-assigned U.S. Appl. No. 10/840,783, now U.S. Appl. No. 8,209,367].

* cited by examiner

APPLICATION-SPECIFIC GROUP LISTING

BACKGROUND

This invention relates generally to a user interface for sharing content, and, more particularly, to a method, apparatus and system for providing utilization of an intermediary module to share content relating to a particular application.

Networks, such as the Internet, intranets, or other private or public networks, are ubiquitous. In fact, many computers are connected to one or more networks at the same time. For example, a business may have hundreds or even thousands of computers coupled to its own private network, which was, at least initially, used primarily for storage and exchange of computer files. At least some of these same business computers may also be coupled to the internet. Further, with the development of wireless devices, ad hoc networks may also be formed with properly configured portable devices. Even telephonic devices, such as cellular phones, pagers and the like, may be coupled to one or more of these networks. Small businesses and homes are also often connected in similar arrangements.

All of this connectivity has naturally led to communications between various users over these networks. For example, electronic mail (e-mail), because of its usefulness, is now commonplace. E-mail is now widely used by businesses and individuals, and in at least some instances has replaced more traditional forms of communications, such as mailed letters, facsimiles, telexes, and the like. However, e-mail has proven to be somewhat awkward when used to carry on an ongoing interaction.

Instant messaging, on the other hand, allows two or more users connected through these networks to carry on an interactive conversation. Exemplary instant messaging systems include Apple ICHAT®, AOL INSTANT MESSENGER®, Microsoft MSN MESSENGER®, YAHOO®, and the like. Typically, two or more users type in messages or select icons, which they send to one another. The receiving party(ies) may immediately respond with an appropriate message or icon. These instant messages are commonly displayed on a participant's monitor in serial fashion, usually scrolling the user's screen from top to bottom.

Each user typically maintains a listing of other people or parties with whom they routinely communicate. Various instant messaging systems use different terminology to identify these other parties, but commonly they are referred to as users, contacts, buddies, or the like. The buddies list allows the user to initiate a conversation with a person on the list by simply selecting them from the list. Additionally, the user can readily determine which of his/her buddies are available by checking a status flag. For example, the listing can be configured to display the status of each buddy. Thus, when a buddy is on-line or available to receive an instant message his/her status is indicated as being on-line or available.

Among the problems associated with the state of the art includes the fact that there is a lack of ability among various users to interact efficiently in the context of an application. Generally, in order to share active contents of a particular application, the user generally has to terminate the activation of an application and separately send various contents to another user who may be on the buddy list of the first user. For example, if a first user is executing a first application, a second user who may be on the buddy list of the first user generally cannot efficiently receive or interact with the first application being executed by the first user. Generally, applications executed by various users are standalone type applications where interactivity between various users in a real-time fashion is generally not possible.

Since various applications are standalone entities, communicating using another module such as instant messaging or e-mailing features, may require actually moving from one platform to another on a multi-tasking-type computer. This requires leaving one application to be able to communicate using another application. For example, one user may have an instant messaging application running concurrently with various other applications, such as word processors, graphics applications, multi-media applications, and the like. In order to communicate with another user on the buddy list, a user would have to leave a particular active application and enter a communications application, such as an email application. In other words, the user would have to leave particular active applications (e.g., word processing application, graphics application, multi-media application, etc.) and enter the communications application in order to perform communications described above. Again, this would compromise the real-time interaction between various users within the context of a particular application.

Furthermore, in order to provide for access of active applications between various users, developers of various applications would have to build client server functionality for each application to provide a collaborative embodiment. Additionally, in order to provide the ability to share content and other aspects of particular applications among various users, a significant amount of work to build connectivity relationships, such as peer-to-peer relationships between various environments, would likely be required. This would call for generating a new class of interaction between various users instead of the traditional client/server relationship.

E-mailing various portions of an application for sharing with another user would be difficult to implement in real-time. Generally, a user may have to close a particular application, extract a file, and e-mail that file to a second user, wherein the second user will have to open that particular file after leaving an active application to do so. Meanwhile, the real-time interaction would be lost in such a situation. Additionally, various applications are developed such that e-mailing various files associated with these applications may be difficult. One such example would be multimedia files because, generally, multimedia files tend to be large size files. E-mailing such large files may be problematic among various users.

The present invention is directed to overcoming or at least reducing one or more of the problems set forth above.

SUMMARY

In one aspect of the present invention, a method is provided for providing active contents between applications activated by a plurality of computer systems. A list of one or more remote users is created. A determination is made whether a first application and a second application are being executed by the at least one or more remote users. The list is updated in response to determining a change in a status of the second application being executed by the one or more remote users using at least one communications feature associated with the first application.

In another aspect of the present invention, a system is provided for providing active contents between applications activated by a plurality of computer systems. The system of the present invention includes a first terminal that is capable of activating a first application, a second terminal capable of activating a second application, and a network system to operatively interconnect the first terminal to the second terminal. The system also includes an application interface that is adapted to create a list of users relating to the first and second terminals. The application interface is capable of determining whether at least one of the first and second applications is being executed by at least one of the first and second terminals. The application interface is also capable of updating the list in response to determining a change in a status of at least one of the first and second applications being executed by at least one of the first and second terminals.

In still another aspect of the present invention, a chat module is provided for providing active contents between applications activated by a plurality of computer systems. The chat module includes a communications unit to provide for log in of a first remote terminal into a network system and provide for communications with a second remote terminal operatively coupled to the network system. The chat module also includes a graphical user interface (GUI) module operatively coupled to the communications unit. The GUI module is adapted to receive a command to provide active content relating to at least one of a first application being executed by the first remote terminal and a second application being executed by the second remote terminal. The chat module is capable of creating a list of users relating to the first and second remote terminals. The chat module is also capable of determining whether at least one of the first and second applications are being executed by at least one of the first and second remote terminals. The chat module is also capable of updating the list in response to determining a change in a status of at least one of the first and second applications being executed by at least one of the first and second remote terminals.

In yet another aspect of the present invention, a computer readable program storage device encoded with instructions is provided for providing active contents between applications activated by a plurality of computer systems. The computer readable program storage device encoded with instructions that, when executed by a computer, performs a method, which comprises: creating a list of one or more remote users; determining whether a first application and a second application are being executed by the at least one or more remote users; and updating the list in response to determining a change in a status of the second application being executed by the one or more remote users using at least one communications feature associated with the first application.

BRIEF DESCRIPTION OF THE DRAWINGS

The invention may be understood by reference to the following description taken in conjunction with the accompanying drawings, in which like reference numerals identify like elements, and in which.

Figure 1:
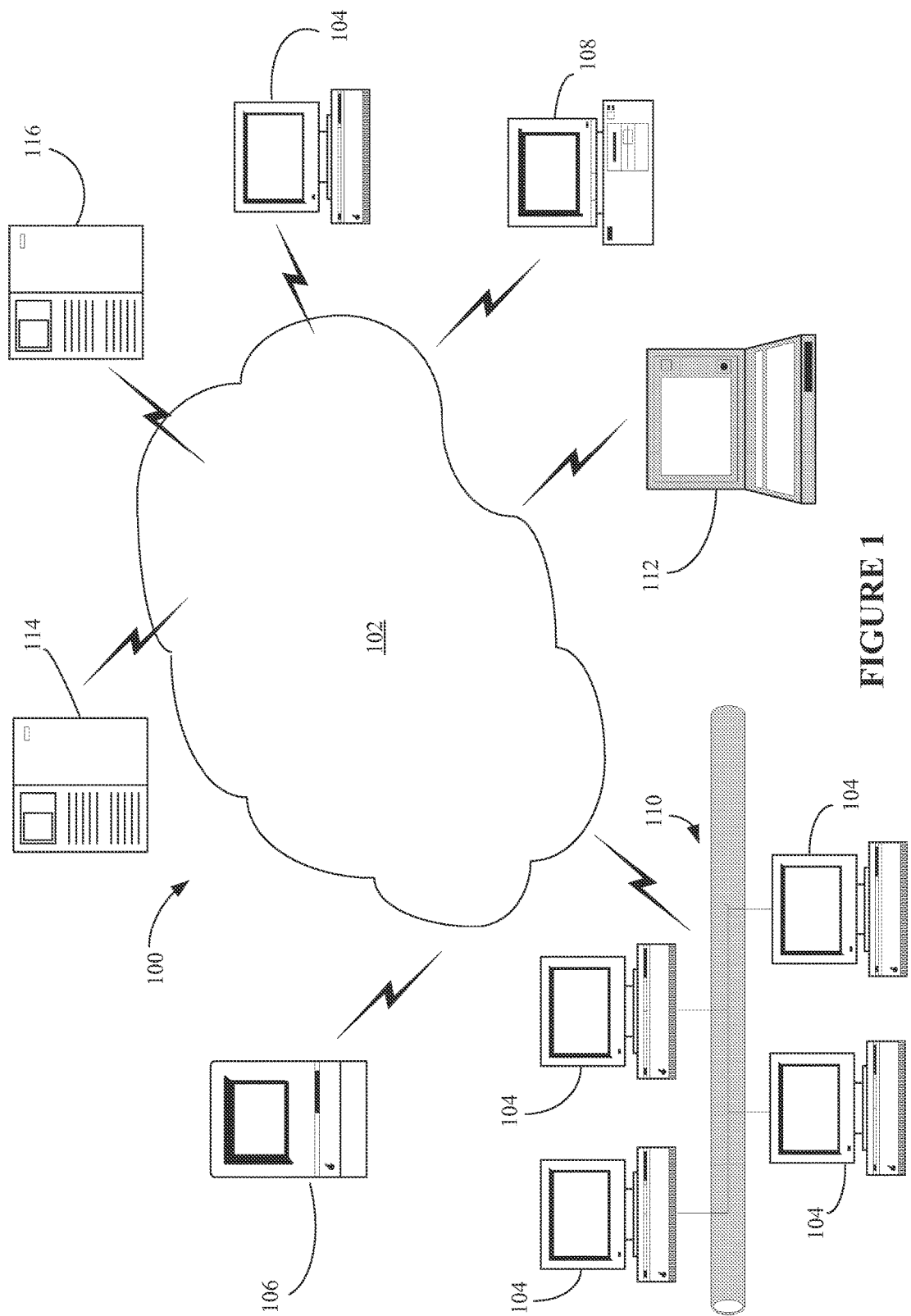
FIG. 1 illustrates a stylized computer network system, in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for real-time or near real-time interaction between various computer users in the context of a particular application. Utilizing embodiments of the present invention, a first user may be able to execute a particular application and communicate with a second user and provide various active contents relating to various aspects of the application to the second user based upon a communication platform, such as an instant messaging platform. For example, a contact list, such as a buddy list relating to an instant messaging platform, may be generated among various users and utilizing embodiments of the present invention, users may share various contents of particular applications via the application running the contact list. For example, a user executing a word processing application may communicate and send various aspects of the word processing application, such as a text document, to another user via a communication platform, such as an instant messaging platform. The contact list may be application specific, wherein each application may have a corresponding contact list. Other examples of applications that may be used in conjunction with embodiments of the present invention may include, but is not limited to, a graphics application, a photo-editing application, a game application, a database application, a presentation application, a organizer application, and/or a drawing application.

Utilizing embodiments of the present invention, a first user may recognize, based upon the updating of a contact list, when a second user is active within a similar application as the one being executed by the first user. The first user may then interface with the second user within the context of the application. Embodiments of the present invention may also provide status updates of various users becoming active or inactive in the application on their respective terminals/computers, thereby providing a real-time status of various users utilizing a particular application. Therefore, utilizing embodiments of the present invention, real-time and/or near real-time content sharing of a particular application or multiple applications may be performed utilizing an independent communication platform such as an instant messaging platform, e.g., the ICHAT® platform offered by Apple Inc. of Cupertino, Calif.

Turning now to FIG. 1, a block diagram depicting a system 100, in accordance with embodiments of the present invention, is illustrated. The system 100 includes a plurality of computing devices coupled together through one or more network connections. For example, a plurality of devices may be coupled together via a private or public network, such as a local area network (LAN) or the Internet 102. In an alternative embodiment, the plurality of devices may be coupled together via an Intranet system. The actual connection between the devices and the Internet 102 may take on one or more of any of a variety of forms, such as a network interface card (NIC), a modem, a digital subscriber line (DSL), a cable modem, a wireless connection, and the like. The devices coupled to the Internet 102 may include, for example, desktop computers or servers, such as an Apple MACINTOSH® 104, a classic Apple MAC® 106, a POWER MAC G4®, a POWER MAC G5®, an IMAC, an IBM compatible personal computer (PC) 108, and the like. Further, these desktop computers, such as the Apple MACINTOSH® 104, may be coupled together via a smaller sub-LAN 110, with the sub-LAN 110 being coupled to the Internet 102. Portable devices, such as the Apple POWER-BOOK® or IBOOK® 112, may also be coupled to the Internet 102, either directly or as part of the sub-LAN 110. Further, other consumer devices, such as cell phones, personal data assistants (PDAs), network appliances, and other embedded devices may be connected to the Internet 102 to employ aspects of the present invention.

The system 100 includes a plurality of servers 114, 116 associated with a plurality of instant messaging providers. The servers 114, 116 are each capable of hosting one or more programs designed to facilitate an instant messaging session between two or more of the computing devices. For example, the server 114 may host programs designed to facilitate communications via iChat® or Microsoft MSN Messenger®. Likewise, the server 116 may host programs designed to facilitate communications via AOL INSTANT MESSENGER® or YAHOO®. In other embodiments of the present invention, additional servers may be present in the system 100 to host programs designed to facilitate communications via a plurality of other instant messaging systems. Using the communications application, such as ICHAT®, the server 116 may facilitate communications relating to active contents of various applications executed by users of the desktop or portable computers illustrated in FIG. 1.

While the invention has been illustrated herein as being useful in a network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that network connections may include a variety of other equipment, such as routers, switches, telephone modems, wireless devices, cable modems, digital subscriber lines, and the like. This type of equipment is not illustrated or discussed in detail herein so as to avoid unnecessarily obfuscating the present invention. For purposes of understanding the present invention, it is sufficient to recognize that additional conventional equipment of this type may be useful in establishing and maintaining communications between the various users.

At least two of the devices in the system 100 have software, such as an application program or a software client, installed thereon to allow an instant messaging session to be initiated and conducted. Generally, operation of an instant messaging system also involves, at least initially, the servers 114, 116. The following description of the operation of an instant messaging system assumes that a user has previously obtained a copy of a software client for his/her computing device, and installed the software client. Thus, the instant messaging session begins when a local user runs or opens the software client. The software client tries to connect to the associated server 114, 116 using a predefined protocol. Once the client is connected to the server 114, 116, a log-on procedure is followed to access or create an account. The log-on procedure may be manual or automatic, but generally involves entry of a name and password to log on to the server 114, 116. If this is the first time that the local user has logged on, he/she may be prompted to sign up for an account and begin using it. When the server 114, 116 verifies the entered name and password, the local user is logged onto his/her account.

The software client sends the server 114, 116 information regarding the connection, such as an IP address and a number of the port assigned to the client. The server 114, 116 accesses a database contained therein and provides the user with his/her contact list or buddy list associated with the account. Initially, the buddy list may be empty, but over time, a user may enter a large number of buddies with which he/she routinely communicates. The contact list or buddy list may be integrated into a particular independent application (e.g., a word processor application, a multi-media application, etc.) being executed by users of the desktop or portable computers illustrated in FIG. 1. The server 114, 116 creates a temporary file and stores connection information regarding the user and the list of buddies/contacts. The server 114, 116 then checks the status of each of the remote users in the local user's buddy list to determine which, if any, are currently logged in/active/on-line.

If the server 114, 116 finds any of the buddies logged on, it sends a message back to the software client on his/her computing device with the connection information for those buddies. The server 114, 116 also sends his/her connection information to the other users in the local user's contact list that are signed (or logged) on to their respective accounts. When the client software gets the connection information for a remote user in the local user's buddy list, it changes the "status" of that person to "Online."

An instant messaging session can be initiated with any of these "online" buddies by selecting their name in the buddy list. A graphical user interface (GUI) opens, allowing the user to enter messages, manage the instant messaging session, and/or exchange active content relating to applications being executed by various users of the desktop or portable computers illustrated in FIG. 1. The remote user receives the local user's "instant message" and may respond. The GUI that each user sees on his/her respective computer display expands to include a scrolling dialog of the conversation. Thereafter, each user's instant messages appear in the GUI on both computing devices.

When the conversation is completed, or a user exits a particular application, the users close the GUI, go offline from the application, and/or exit the software client. When this happens, the software client sends a message to the server 114, 116 to terminate the session. The server 114, 116 sends a message to the software client of each user on the local user's buddy list that is currently online to indicate that the local user has logged off a particular application. Finally, the server deletes the log in the temporary file that contains the connection information for the local user's software client or the local user's active status in an application. Thus, in the buddy lists of the local user's contacts that are online, the local user's name moves to the "Offline" status section for a particular application.

Figure 2:
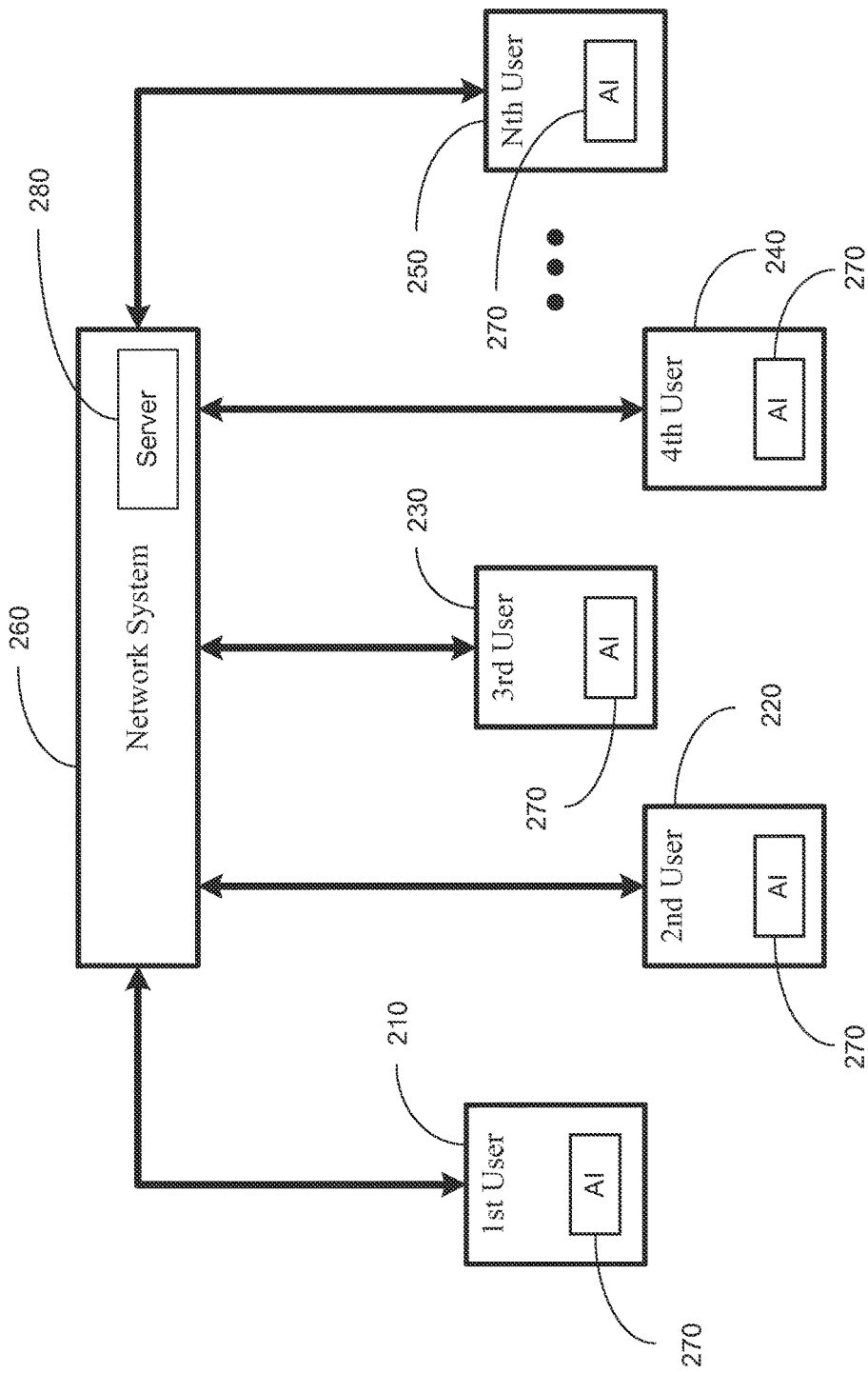
FIG. 2 illustrates a client/server network system, in accordance with one illustrative embodiment of the present invention.

Turning now to FIG. 2, a client/server based system, in accordance with embodiments of the present invention, is illustrated. The system illustrated in FIG. 2 may comprise a plurality of users that may operate from various remote terminals/computers, such as the terminals described in FIG. 1. A network system 260 may host various users. The network system 260 may comprise a server 280 that is capable of providing for communications between various users. The network system 260 may be linked to a first user 210, a second user 220, a third user 230, and a fourth user 240, to an $N^{th}$ user 250. In one embodiment, the first through $N^{th}$ users 210-250 may be of various types of computing devices, physical or virtual, such as a computer, a telephone, a settop box, a network appliance, or any device capable of connecting to the network system 260 and receiving active content.

Each of the users 210-250 may comprise an application interface (AI) 270 that is capable of providing a communication interface between an application executed by a first user 210, for example, to other users, for example a second user 220, via the network system 260. This communication interface may be facilitated by a communication application, such as an instant messaging application (e.g., ICHAT'). Utilizing embodiments of the present invention, a first user 210 may execute a particular application via the application interface 270, and may communicate within the context of the application to exchange active content with a second user 220, who is also executing a similar application. This communication may be performed at a real-time and/or a near real-time fashion. A more detailed illustration of the application interface 270 is provided in various figures and accompanying descriptions below.

Figure 3A:
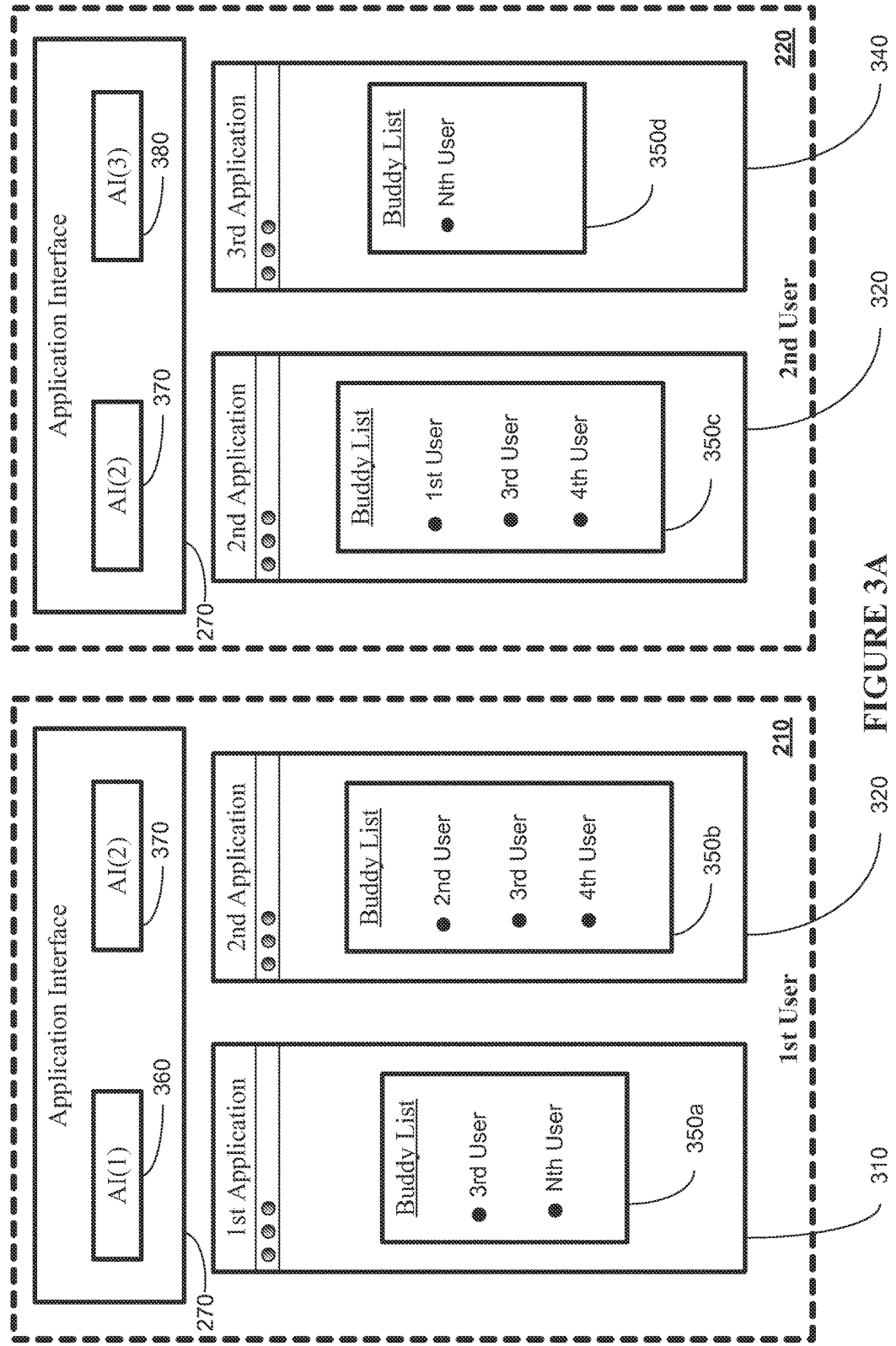
FIG. 3A illustrates a more detailed block diagram illustration of a first and second users associated with the client/server network system, in accordance with one illustrative embodiment of the present invention.

Turning now to FIG. 3A, a more detailed illustration of various applications being executed by the first user 210 and the second user 220 is illustrated. This illustration of the execution of various applications is for illustrative purposes and those skilled in the art would appreciate that alternate execution of applications may be performed and remain within the spirit and scope of the present invention. As illustrated in FIG. 3A, the first user 210 may execute one or more e.g., first application 310 as well as a second application 320, and/or more applications. For example, the first application 310 may be a non-communications application, such as a word processing program and the second application 320 may be a another non-communications application such as a photo-editing program. The term non-communications application may include various types of applications that are not exclusively dedicated to providing communications, such as a chat application or an email application. Similarly, the second user 220 may execute the second application 320 and a third application 340. Utilizing embodiments of the present invention, the first user 210 may be able to view a contact list or a buddy list 350, which may provide an indication of the status of other users who are executing similar applications and are part of the contact list 350 implemented by the first user 210. For example, the contact list 350a associated with the first application 310 may indicate that the third user 230 and the $N^{th}$ user 250 are also active in the first application 310 on their respective remote terminals.

Similarly, for example, a second contact list 350b associated with the second application 320 may indicate that the second user 220, the third user 230, as well as the fourth user 240 are active in the second application 320 on their respective remote terminals. Likewise as indicated in FIG. 3A, the second user 220 may view a third contact list 350c associated with the second application 320 that may indicate that the first user 210, third user 230 and the fourth user 240 are active in the second application 320. Furthermore, the second user 220 may recognize that a fourth contact list 350d associated with the third application 340 indicates that the $N^{th}$ user 250 is active in the third application 340 being executed on a remote terminal associated with the $N^{th}$ user 250.

The users appearing on the various contact lists 350a-d, associated with particular applications being executed by the first user 210, generally belong to a contact list or a buddy list 350(a-d) created by the first user 210. In one embodiment, only preferred users 210-250, which are selected by the first user 210, will appear on the first and second contact lists 350a, 350b. A particular user may register interest to be part of a buddy list. In one embodiment, a user may register interest in being part of a buddy list for a particular group of people. In one embodiment, the group of people to which a user is registering interest, may include a group of people who are active in a particular application. In an alternative embodiment, any one of the $1^{st}$ through $N^{th}$ user 210-250, or any one of the $1^{st}$ through $N^{th}$ piers 410-440, may perform a polling function to determine if a particular user is to be added to a buddy list, or determine if a particular user is active and available for communications via an active application. The first application 310 and the second application 320 will generally communicate via the application interface 270.

In one embodiment, the application interface 270 may comprise sub-application interfaces AI(1) 360 and AI(2) 370, which are respectively associated with the first application 310 and the second application 320. Similarly, the second user 220 may also comprise an application interface 270 that comprises an AI(2) 370 and an AI(3) 380 associated respectively with the second application 320 and third application 340. The application interface 270 is utilized by the first user 210 and the second user 220 to provide for a communications interface between the applications 310, 320, 340. Therefore, an intermediate module, such as a chat program or an instant messaging program, such as iChat® offered by Apple Inc. of Cupertino, Calif., may be utilized to facilitate active contact transactions and other communications between the applications being executed by the first user 210 and other users associated with the network system 260. Further details relating to the type of communications facilitated by the application interface 270 are provided below.

Figure 3B:
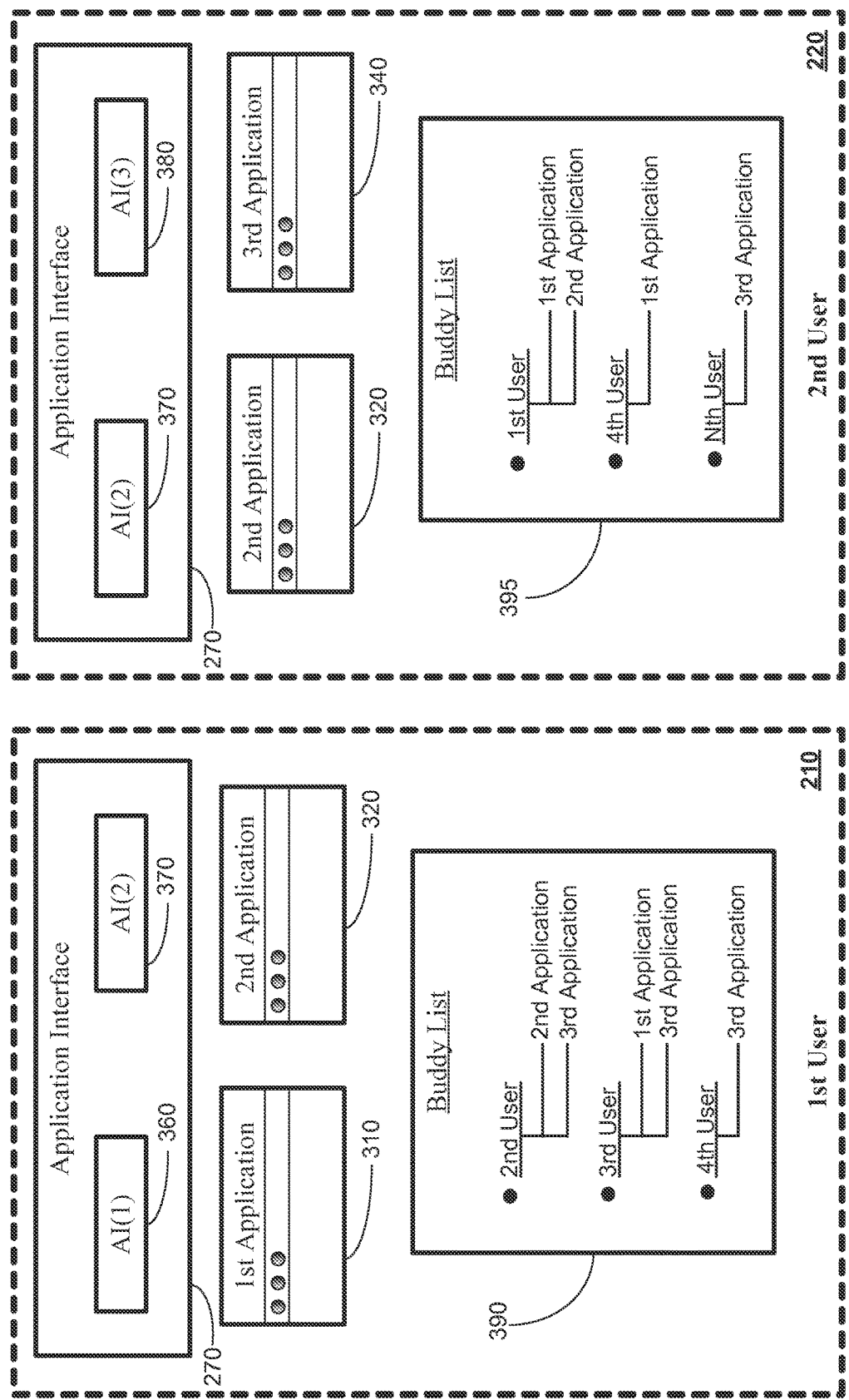
FIG. 3B illustrates an alternative embodiment of the first and second users associated with the client/server network system of FIG. 3A.

Turning now to FIG. 3B, a more detailed illustration of an alternative embodiment of the first user 210 and the second user 220 executing various applications is illustrated. The embodiment illustrated in FIG. 3B provides for a general buddy list that may encompass a buddy list (communications list) for a plurality of applications. As illustrated in FIG. 3B, the first user 210 may execute one or more applications, e.g., first application 310 and the second application 320. For example, the first application 310 may be a word processing program and the second application 320 may be a photo editing program. Similarly, the second user 220 may execute one or more applications, e.g., the second application 320 and a third application 340. The first user 210 may comprise a buddy list 390, which may list various users, such as the second user 220, a third user 330, and a fourth user 340.

The buddy list 390 may indicate the particular applications that are being executed by the users listed in the buddy list 390. For example, the buddy list 390 of the first user 210 may indicate that the second user 220 is executing the second and third applications 320, 340. Likewise, a buddy list 395 in the second user 220 will list various users and any particular applications executed by the user. For example, the buddy list 395 of the second user 220 may indicate that the first user 210 is executing the first and second applications 310, 320. The listing of the applications and the users in the buddy lists 390, 395 may generally be based upon a registration of various users that the first user 210 may register into the buddy list 390.

Additionally, the fact that the various applications executed by the second user 220 appear in the buddy list may be a result of the second user 220 having registered the fact that the second user is publicizing the execution of the second and third applications 320, 340. In other words, the information appearing on the buddy lists 390, 395, in one embodiment, is based upon volunteer registration performed by each of the users and the type of applications that each user is executing. The buddy lists 390, 395 provide information relating to other users that may be logged in on a network system 260, and who have registered their interest in publicizing their status of executing various applications.

Furthermore, the embodiments illustrated in FIG. 3B provide for exchanging status of various applications being executed by the other users, as well as, active content relating to the particular applications being executed by various users. For example, an exchange of a photo file may be exchanged between the first and second users who are both executing the second application 320, which in one embodiment, may be a photo editing application. Since the first user 210 can see that in its buddy list 390 that the second user 220 is executing the second application 320, and also because the second user 220 can view in its buddy list 395 that the first user 210 is executing the second application 320, an exchange of active content may be initiated by the first user 210 or the second user 220.

Figure 4:
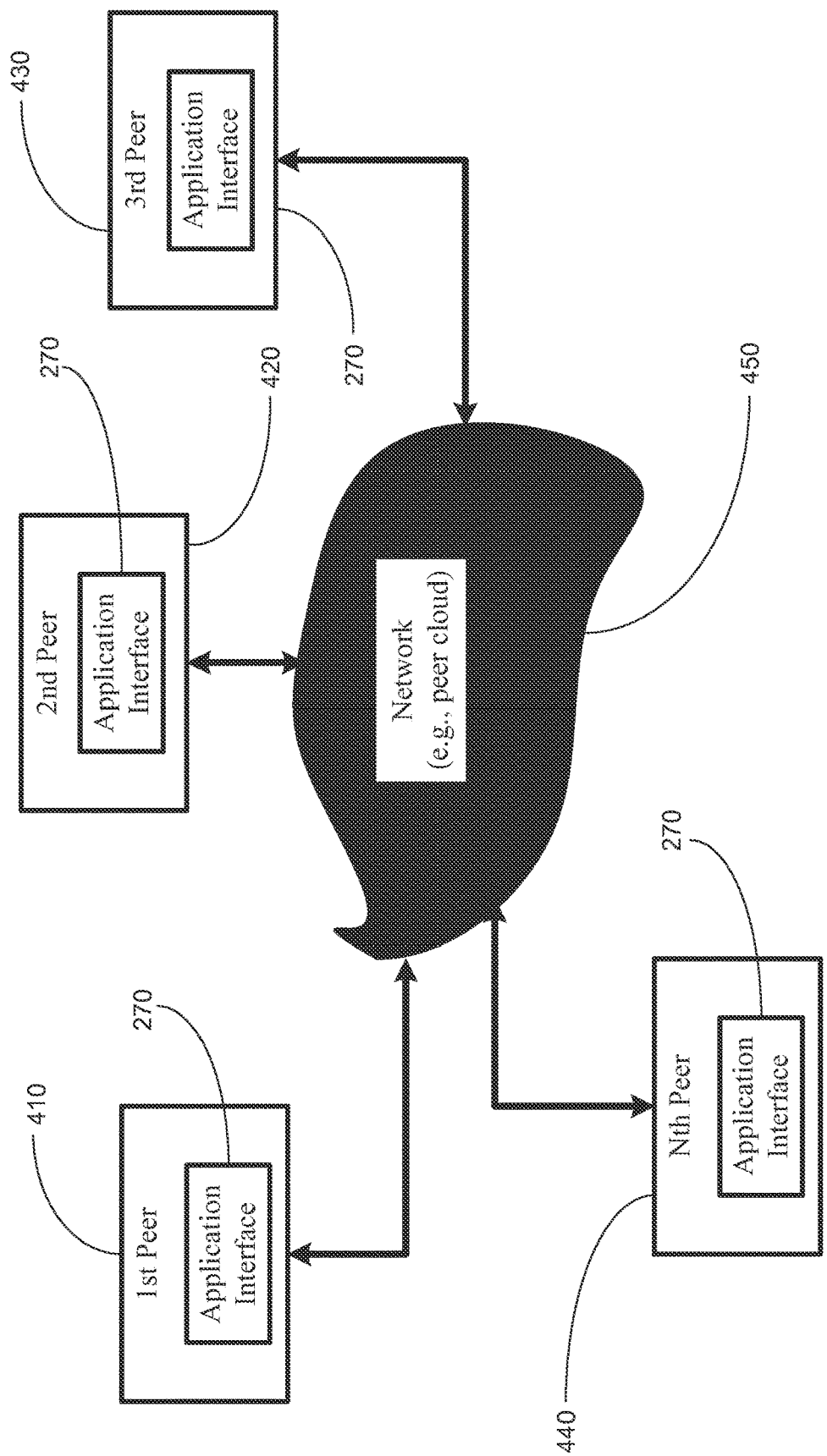
FIG. 4 illustrates a peer-to-peer system, in accordance with one illustrative embodiment of the present invention.

Turning now to FIG. 4, another implementation of a peer-to-peer configuration in accordance with embodiments of the present invention is illustrated. FIG. 4 illustrates a first peer 410, a second peer 420, and a third peer 430 through an Nth peer 440, being interconnected for facilitating peer-to-peer communications via a network 450. In one embodiment, the peer-to-peer connections may be provided by the network 450, which in one embodiment may be a peer-to-peer network. The first through $N^{th}$ peers 410-440 may each comprise an application interface 270 that is capable of interfacing with one or more applications being executed by each of the peer stations or terminals. The application interface 270 is capable of interfacing with other peers via their respective application interfaces 270 through the peer cloud 450. Utilizing the application interface 270, active content relating to particular applications may be transferred to and from various peer-to-peer connections.

In one embodiment, the first peer 410 may be a sender peer and the second peer 420 may be a recipient peer. However, those skilled in the art would appreciate that the designation of a peer as a sender or receiver is not fixed and that in practice, a peer is sometimes sending data and sometimes receiving data. Active content, as used by embodiments of the present invention, may refer to a variety of data, such as, for example, data files in current use at a peer or a user station. The data file may be text data, or media content, such as an audio or video file being played in a media player, text, graphics, or numeric content, such as a document, spreadsheet, code file, graphics file, or any other file having data representing content that is capable of perception by a user or a peer. In one embodiment, the first peer 410 may activate various contents within the context of an application being executed by the first peer 410. The content(s) may then be synchronized into an active content stream and transmitted to other peers on the network 450. In one embodiment, the peers 410-440 may be of various types of computing devices, physical or virtual, such as a computer, a telephone, a settop box, a network appliance, or any device capable of connecting to the network 450 and receiving active content.

The second peer 420 may receive the active content from the first peer 410 and may be displayed in a graphic user interface (GUI). The active content transmitted by the first peer 410 to the second peer 420 may be based upon communications enabled by the application interface 270, which may include an intermediary module, such as a chat or instant messaging program (e.g., ICHAT®). Other applications may include the first peer 410 providing multimedia active content, such as music audio files that may be received and executed by the second peer 420, such as music files utilized by music programs, such as iTunes® offered by Apple Inc. of Cupertino, Calif. This type of communication may be used to perform file exchanges and other commerce activities, such as the first peer 410 providing a music file to the second peer 420 for purchase.

The network 450 may be public or private, including both wired and wireless portions. The network 450 may facilitate transmission and reception of data in packets or through circuits and use communications protocols such as Internet Protocol (IP) or Asynchronous Transfer Mechanism (ATM). Combinations of the previous variations of network communication are within the scope of the present invention since it is transport independent.

Whether embodiments of the present invention are implemented in a client server communication protocol, such as the system illustrated in FIG. 2, or in a peer-to-peer communication protocol, such as the system illustrated in FIG. 4, these embodiments may be used to achieve a real-time communication and updating of content or contact lists in the context of various applications executed by users of the systems. Embodiments of the present invention also provide for a non-polled system where a user or a peer may register for interest, either passively or actively, an inclusion in a contact list or a buddy list, which may be updated automatically. This allows for the creation of work-groups of people using similar applications on a real-time or a near real-time basis. Utilizing embodiments of the present invention, the applications utilized by various users 210-250 may be integrated into a work-group such that these applications or contents from these applications may be shared. In one such example, a user executing a word processing application may be able to communicate with another user in a remote location that is using similar word processing applications, and exchange files and various contents between each other via the application interface 270. The fact that one user has activated a similar application may automatically update another user's contact list or buddy list 350. Therefore, the contact/buddy list 350 provides a particular user with the status of other interested users utilizing the same application.

Figure 5:
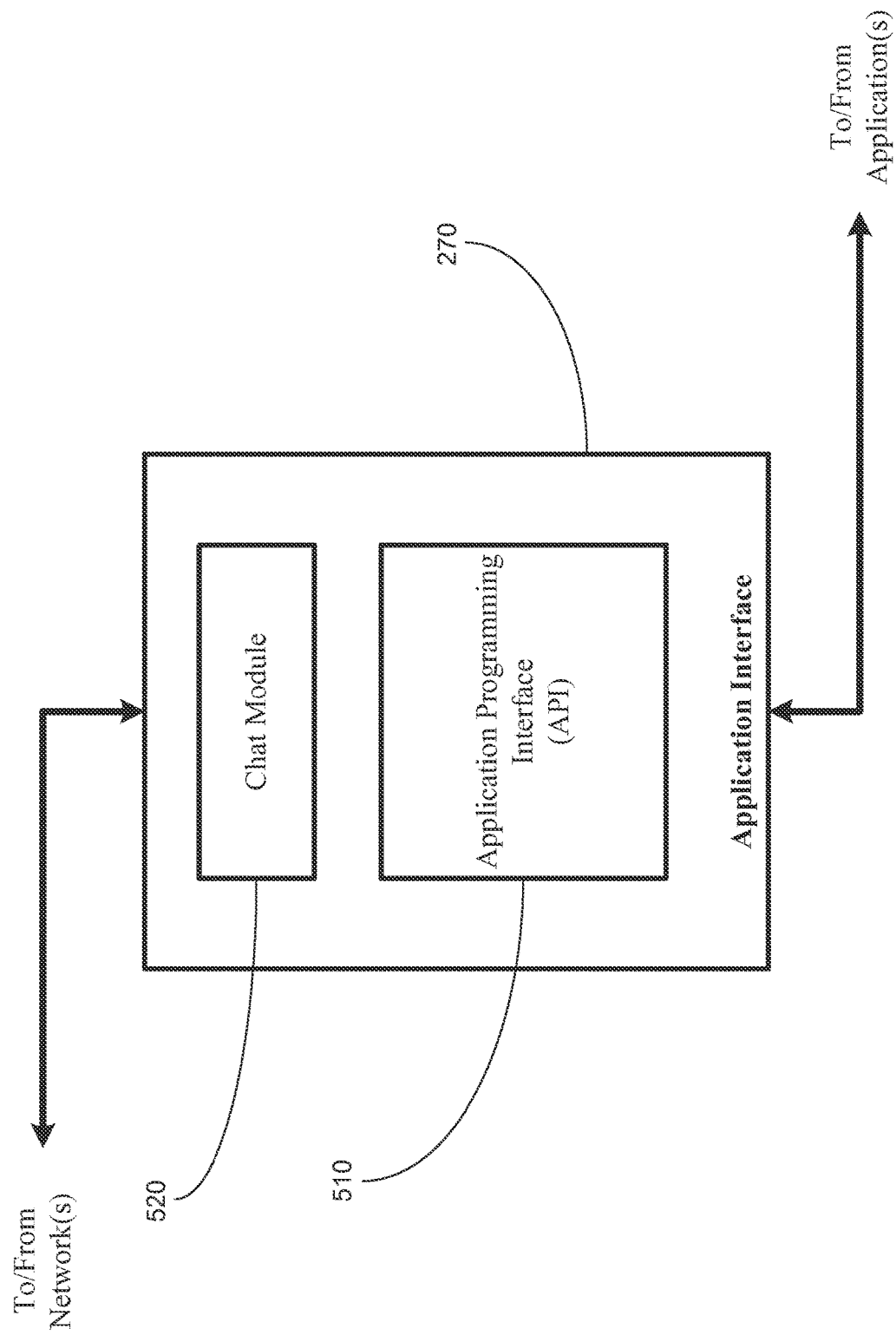
FIG. 5 illustrates a more detailed block diagram depiction of an application interface of FIGS. 2 and 4, in accordance with one illustrative embodiment of the present invention.

Turning now to FIG. 5, a block diagram depiction of the application interface 270 in accordance with one embodiment of the present invention is illustrated. In one embodiment, the application interface 270 comprises a chat module 520 and an application programming interface 510. The application programming interface (API) 510 provides for programming an interface for a particular application such that a desired type of communication in the context of the application may be facilitated. Developers may customize interfacing of a particular application by programming various aspects of the interface using the API 510. Utilizing the chat module 520, updating of the contact/buddy list 350 and/or transfer of active content may be facilitated by the application interface 270. Therefore, the application interface 270 is able to communicate between a particular application being used by a user and to the network 450 for communication with other users. A more detailed description of the application interface 270 is illustrated in FIG. 7 and accompanying description below.

Figure 6:
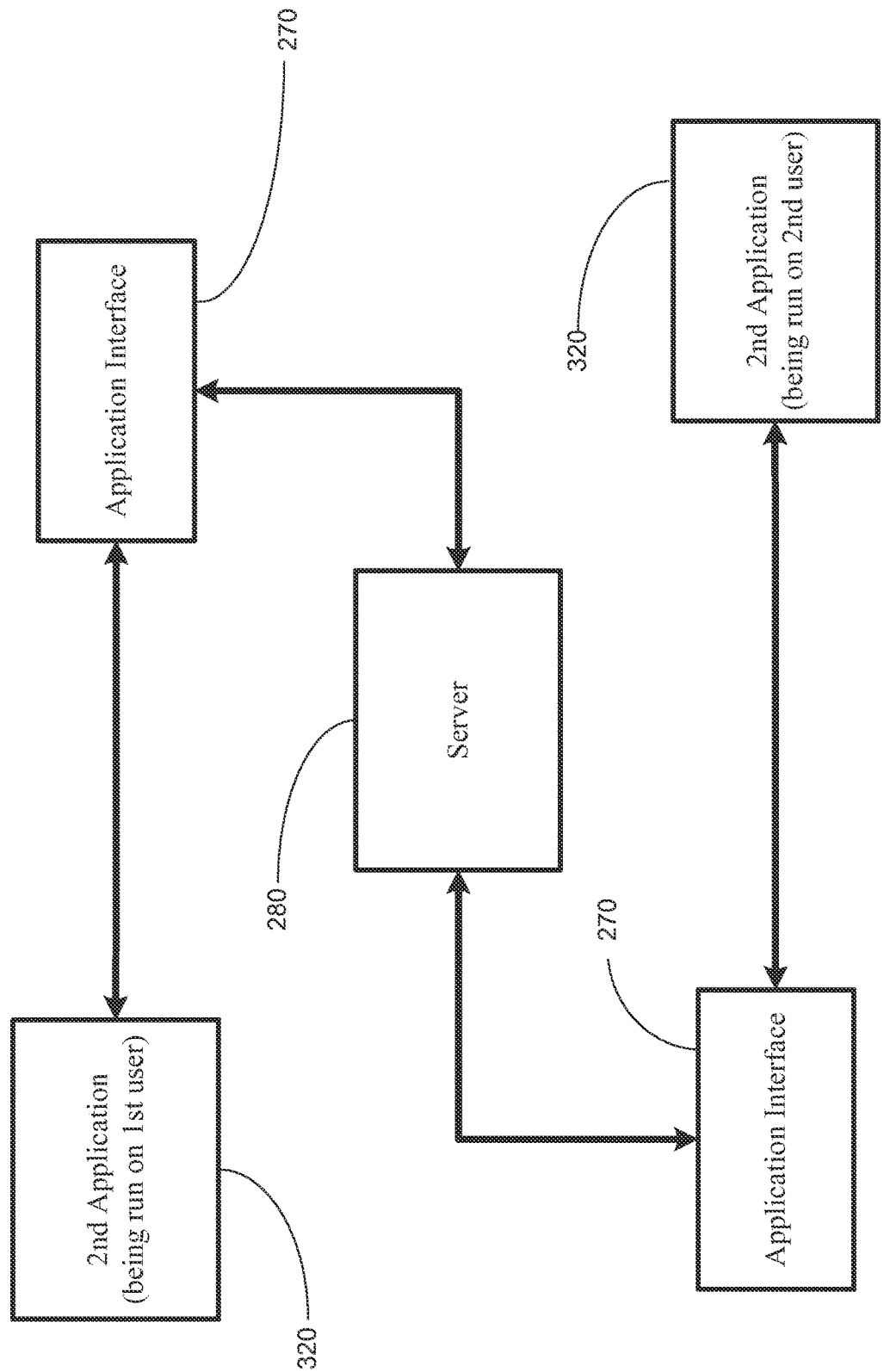
FIG. 6 illustrates a block diagram depiction of an interaction between an application being executed by a first and second user.

Turning now to FIG. 6, a block diagram depicting a communications flow relating to the application interface 270, in accordance with one embodiment of the present invention, is illustrated. The second application 320 being run on the first user 210, for example, communicates with the application interface 270. The application interface 270 then in turn, communicates with a server 280 or a peer cloud 450. The server 280 then communicates with another application interface 270, which in turn provides for communications with the second application 320 being executed on the second user 220. Therefore, the application interface 270 provides for data transactions via the server 280 or the peer cloud 450, between the first user 210 and the second user 220. Therefore, the second application 320 being run on the first user 210 will update a contact list or a buddy list 350 associated with that particular application, indicating to the first user 210 that the second application 320 is also being executed on the second user 220. Hence, updating of the contact list 350 may be facilitated; similarly, transfer of active contents relating to the second application 320 between the first user 210 and the second user 220 is also facilitated.

Figure 7:
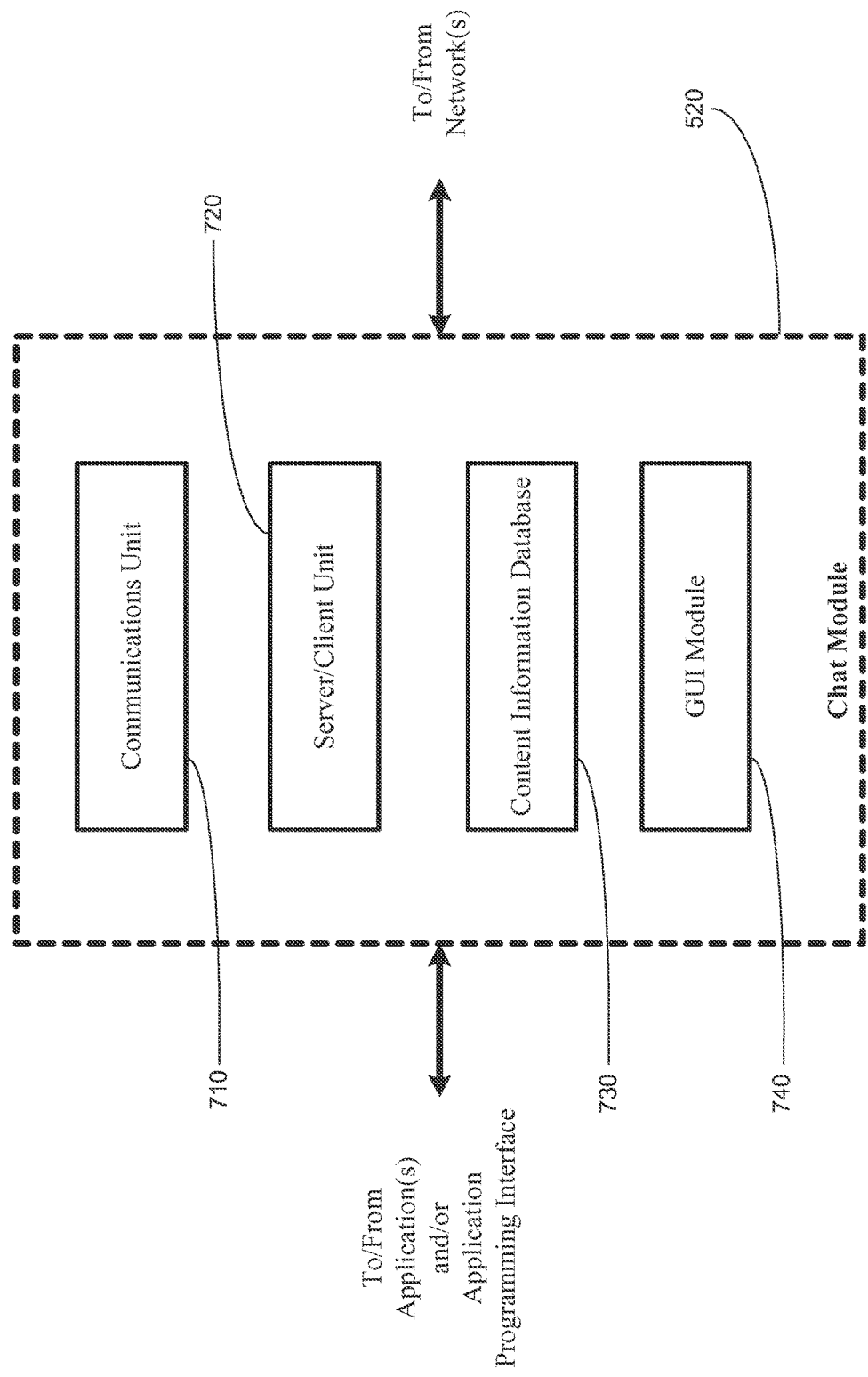
FIG. 7 illustrates a more detailed block diagram depiction of a client module of FIG. 5, in accordance with one illustrative embodiment of the present invention.

Turning now to FIG. 7, a block diagram depiction of the chat module 520, in accordance with one embodiment of the present invention, is illustrated. In one embodiment, the chat module 520 comprises a communications unit 710, a server/client unit 720, a content information database 730, and a GUI module 740. In one embodiment, the communications unit 710 provides a communications pathway for the chat module 520 to transmit and receive messages and to share active content through a server/client network and/or a peer-to-peer network. The communications unit 710, in one embodiment, may log into a centralized chat server and establish a point-to-point communication between other users and/or peers by exchanging network addresses, such as IP addresses. The communications unit 710 may also comprise a network interface, appropriate protocol stack, an operating system or port control, a client server network software, a peer network software, or an application software.

The server/client unit 720 may send and receive active content information for output and input to and from other clients or peers. The server/client unit 720 may perform synchronized data streaming of active content. Synchronization of data, however, may include substantially synchronizing data, since the operation is dependent on network load, streaming parameters, and/or various other conditions. In one embodiment, the server/client unit 720 may be an FTP, desktop sharing software, an audio video server, or any other device capable of sending and receiving active content via a network. The content information database 730 may store information regarding active content shared among various clients and/or peers. Active content information may include, but is not limited to, meta-data about data files, such as its size, and auxiliary data files related to data files, such as a unique identifier, related image file, content file, content source, or any other information directly or indirectly related to the content. The content information database 730 may be queried by an identifier, such as an MP3 ID tag received by the chat module 520. In response, the content information database 730 may make matching information available, such as the MP3 content title. This information may be displayed by a client or a peer, or may be sent to another client or peer.

In one embodiment, the unique identifier may comprise an active content fingerprint, such as a hash key or wavelet. The hash key may be determined by an algorithm implementing a computational transform on binary data such as a SHA-1 or CRC32. The unique identifier may be used by a client or a peer to retrieve locally stored, active content information associated with a particular application being executed.

The GUI module 740 may provide user interface of the chat module 520 and receive user commands related to various contents associated with applications being executed by various clients or peers. In one embodiment, the GUI module 740 may integrate active content information relating to a particular application into the chat module 520 and provide for communications with other clients or peers via the communication unit 710. The GUI module 740 may also receive commands to initiate various synchronized data streams or initiate and execute a transaction. The GUI module 740 may include a graphical engine, an audio/video CODEC, a processor, an operating system, graphics software, and other graphic enhancing devices or software. The chat module 520 allows for updating various content lists associated with particular applications utilized by users and/or providing for active content relating to particular applications being executed by various clients or peers.

Figure 8:
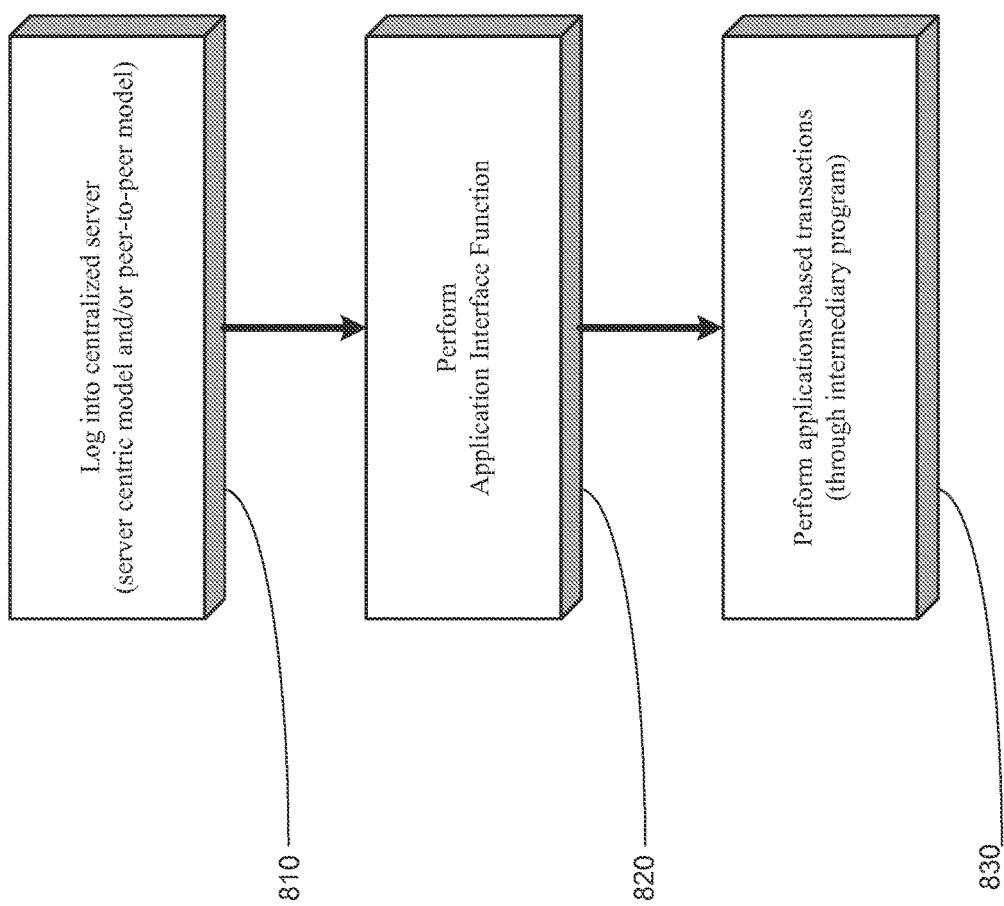
FIG. 8 illustrates a flowchart depicting a method in accordance with one illustrative embodiment of the present invention.

Turning now to FIG. 8, a block diagram for implementing the methods associated with embodiments of the present invention is illustrated. The peer-to-peer and/or the client/server systems illustrated in the present disclosure may provide for a particular user, such as the first user 210, to log into a centralized network or server (block 810). A peer station may log into a network or peer cloud 450, similarly, a first user 210 may log into a client server network system 260. Embodiments of the present invention may be implemented into a server centric model and/or into a peer-to-peer model. Upon logging into a centralized system or into a peer-to-peer system, a user, by implementing embodiments of the present invention, may be able to detect whether another user involved with the system may be interested and/or had activated a similar application as one that is being run by the original user.

A user may receive notification from the server centric or peer-to-peer system that the implementation of a particular application has changed state in some interesting manner, such as quitting, launching, sleeping, crashing, or various other status updates. The server centric or peer-to-peer system may then perform an application interface function to provide for communication of contact lists or buddy lists 350 and/or active contents between various users of the system(s) (block 820). A more detailed description of the application interface function described in block 820 is provided in FIG. 9 and accompanying description below.

Upon performing the application interface function, the server centric system or the peer-to-peer system may then allow for application spaced transactions, such as updating of contact lists or buddy lists 350, providing transactions of active contents of various applications between various users in the system, and the like (block 830).

Figure 9:
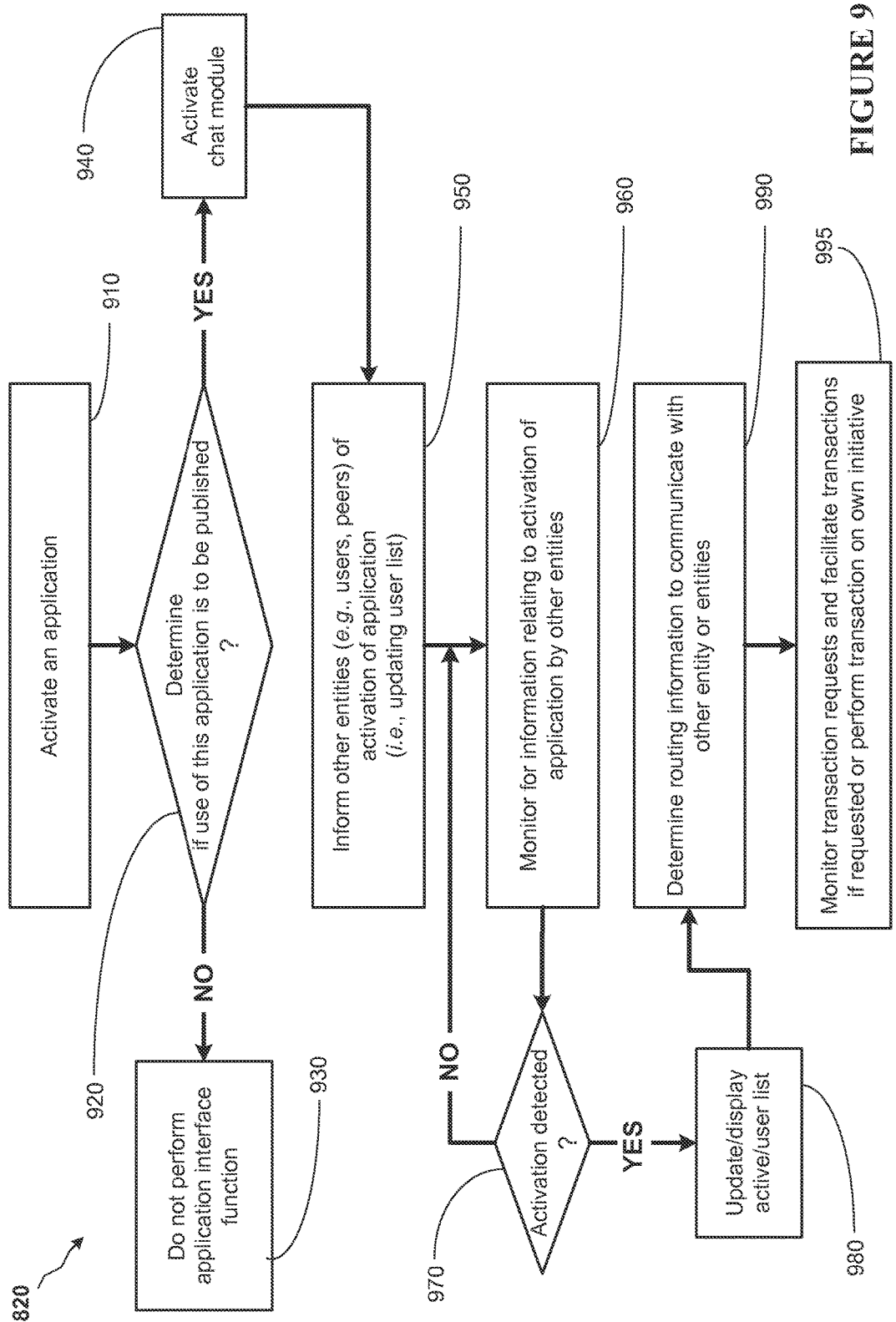
FIG. 9 illustrates a more detailed illustration of an application interface function of FIG. 8, in accordance with one illustrative embodiment of the present invention.

Turning now to FIG. 9, a more detailed block diagram depiction of performing the application interface function described in block 820 of FIG. 8, is illustrated. In one embodiment, the user of a user centric system or a peer of a peer-to-peer system may activate a particular application (block 910). Examples of the application may include a word processing software, a graphic software, a music software, a photo editing software, and/or other applications. The user may determine whether the use of this particular application is to be publicized or not (block 920). In some cases, for uses of a particular application, it may be desirable not to publicize the activation of the application for various security reasons or privacy reasons. For example, a user may decide that the application of activating a music program is not to be published to a server centric or a peer-to-peer system. Additionally, applications relating to access to private intranet or Internet access may not be published to preserve security integrity.

There are various methods of determining whether a particular application is to be published. One option is to have an intermediary program in the application interface 270, such as iChat®, maintain a list of particular applications that are to be excluded or included for publication to the server centric or the peer-to-peer system. In an alternative embodiment, the particular applications themselves may have a preference setting that can be set or reset to indicate whether the activation of the application may be published. If such an activation is to be published, this status may be communicated via the application interface 270 (e.g., ICHAT®).

If it is determined that implementation of the application is not to be published to a server centric or a peer-to-peer model, the application interface function may not be performed and is terminated (block 930). If it is determined that the activation of the application is to be published, the remote terminal of the user then activates the chat module 520 (block 940). Activation of the chat module 520, as described above, provides for communications between various applications being executed by various users on a server centric system or a peer-to-peer system in the context of the particular application. Upon activation of the chat module 520, other entities, such as other users or peers, are informed of the activation of the application by the user (block 950) Informing other users and/or peers of the activation of the application may include transferring contents that includes information such that contacts lists or buddy lists 350 may be updated. Therefore, for example, a second user 220 may receive an update on its third contact list 350c associated with the second application 320, which is also being executed by the first user 210.

Once the users/peers are aware of activation of a particular application, i.e., the contact lists or buddy lists 350 are updated, a particular user may monitor for information relating to activation of the application by other entities for status updates. This monitoring may be handled in a variety of manners, such as by the use of a polling system or a non-polling system, upon which an update of an activation of an application is detected by the application interface 270 (block 960).

Monitoring for information related to the activation of a particular application may be performed by identifying a particular identifier relating to a particular application. One such option may be to implement a typing creator, which may be two to four character codes relating to a particular application and monitoring the activation or de-activation of that particular code. In an alternative embodiment, a mine type arrangement may be made where the signature of the application may be detected to determine whether a particular application is being executed by a remote entity. In yet another alternative embodiment, a URL access or URL description may be detected to determine whether a particular application is being executed by a remote entity.

The embodiments of the present invention may be applied such that a particular application will only see information relating to the status of other people that are utilizing that particular application who are selected to be on contact list or buddy list 350. The application interface 270, which may employ programs, such as ICHAT®, may itself maintain a list of how many users are using different applications. However, the particular application, such as the first application 310, will only see information relating to other users that are also executing the first application 310 on their remote terminal. An updating of the execution of a particular application may be performed by the application directly communicating with the network, or alternatively, the application communicating through an intermediary module such as ICHAT® via the application interface 270.

While monitoring the activation or de-activation of applications by other entities, a determination is made whether an activation status change has occurred (block 970). If no status change has occurred, the monitoring of status of the activation or de-activation of applications continues as illustrated in FIG. 9.

Upon a detection that an activation has occurred, an updating and displaying of the active list is provided (block 980). In other words, the contact list or buddy list 350 associated with a particular application is updated to reflect the new status relating various entities executing the particular application. A determination is then made regarding the routing information relating to communication with other entities. This routing information may include determining the IP address and other routing information that may be used to facilitate communications from one application to another via the intermediary programs, such as ICHAT® (block 990). Upon determining the routing information, the application interface 270 may monitor requests for transactions relating to a particular application and facilitate transactions responsive to request(s) for transmission or reception of active contents relating to a particular application (block 995).

Utilizing the methods described above, a contact list or buddy list may be maintained and updated in real-time or near real-time relating as to which other users of a server centric system or peers of a peer-to-peer model system is active in a particular application of interest. Furthermore, communication within the context of transmitting and receiving contents of a particular application may be facilitated utilizing the methods described above. Utilizing embodiments of the present invention, various users on a client/server system or various peers in a peer-to-peer system may communicate and send and receive active contents relating to a particular application among various users. A contact list or a buddy list may be maintained to update a list when a particular user activates or de-activates a particular application. This provides for efficient communication with other users relating to particular applications, which in turn may increase efficiency, creativity, and productivity among various work-groups.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:
    receiving data at a first instance of a first standalone application executing on a local device from a second standalone application executing on the local device, the data identifying an execution status of one or more additional instances of the first standalone application for each of one or more user accounts, wherein the second standalone application comprises an instant messaging application, and wherein the first standalone application comprises at least one of a word processing application, a graphics application, a photo-editing application, a game application, a database application, a presentation application, an organizer application, and a drawing application;
    displaying, from within an interface of the first instance of the first standalone application, an identifier of the execution status for each of the one or more additional instances of the first standalone application for each of the one or more user accounts;
    receiving, by the first instance of the first standalone application executing on the local device, an indication from the second standalone application that the execution status of a particular instance of the one or more additional instances of the first standalone application on a first remote device has changed; and
    updating, within the interface of the first instance of the first standalone application, the identifier based on the changed execution status in response to the indication.

2. The method of claim 1, wherein the execution status of each of the one or more additional instances of the first standalone application comprises at least one of activation, deactivation, exit, and termination.

3. The method of claim 1, further comprising:
    determining whether a local execution status of the first instance of the first standalone application on the local device is to be published based, at least in part, on a setting in the second standalone application; and
    initiating transmission of the local execution status to the first remote device based on a determination that the local execution status is to be published.

4. The method of claim 1, further comprising:
    providing real-time communications between the local device and the first remote device in the interface of the first instance of the first standalone application via the second standalone application.

5. The method of claim 4, wherein providing real-time communications between the local device and the first remote device in the interface of the first instance of the first standalone application via the second standalone application comprises transmitting active content relating to the first instance of the first standalone application on the local device to the first remote device.

6. The method of claim 5, wherein the active content includes a data file associated with the first instance of the first standalone application on the local device.

7. A non-transitory computer-readable medium comprising one or more processors, wherein the one or more processors comprise instructions, which, when executed, cause the one or more processors to:
    receive data at a first instance of a first standalone application executing on a local device from a second standalone application executing on the local device, the data identifying an execution status of one or more additional instances of the first standalone application for each of one or more user accounts, wherein the second standalone application comprises an instant messaging application, and wherein the first standalone application comprises at least one of a word processing application, a graphics application, a photo-editing application, a game application, a database application, a presentation application, an organizer application, and a drawing application;
    display, from within an interface of the first instance of the first standalone application, an identifier of the execution status for each of the one or more additional instances of the first standalone application for each of the one or more user accounts;
    receive, by the first instance of the first standalone application executing on the local device, an indication from the second standalone application that the execution status of a particular instance of the one or more additional instances of the first standalone application on a first remote device has changed; and
    update, within the interface of the first instance of the first standalone application, the identifier based on the changed execution status in response to the indication.

8. The non-transitory computer-readable medium of claim 7, wherein the execution status of each of the one or more additional instances of the first standalone application comprises at least one of activation, deactivation, exit, and termination.

9. The non-transitory computer-readable medium of claim 7, wherein the instructions further comprise instructions to cause the one or more processors to:
    determine whether a local execution status of the first instance of the first standalone application on the local device is to be published based, at least in part, on a setting in the second standalone application; and
    initiate transmission of the local execution status to the first remote device based on a determination that the local execution status is to be published.

10. The non-transitory computer-readable medium of claim 7, wherein the instructions further comprise instructions to cause the one or more processors to:
    provide real-time communications between the local device and the first remote device in the interface of the first instance of the first standalone application via the second standalone application.

11. The non-transitory computer-readable medium of claim 10, wherein the instructions to cause the one or more processors to provide real-time communications between the local device and the first remote device in the interface of the first instance of the first standalone application via the second standalone application comprise instructions to cause the one or more processors to initiate transmission of active content relating to the first instance of the first standalone application on the local device to the first remote device.

12. A device, comprising:
a display; and
one or more processors, comprising instructions, which, when executed, cause the one or more processors to:
receive data at a first instance of a first standalone application executing on a local device from a second standalone application executing on the local device, the data identifying an execution status of one or more additional instances of the first standalone application for each of one or more user accounts, wherein the second standalone application comprises an instant messaging application, and wherein the first standalone application comprises at least one of a word processing application, a graphics application, a photo-editing application, a game application, a database application, a presentation application, an organizer application, and a drawing application;
display, from within an interface of the first instance of the first standalone application, an identifier of the execution status for each of the one or more additional instances of the first standalone application for each of the one or more user accounts;
receive, by the first instance of the first standalone application executing on the local device, an indication from the second standalone application that the execution status of a particular instance of the one or more additional instances of the first standalone application on a first remote device has changed; and
update, within the interface of the first instance of the first standalone application, the identifier based on the changed execution status the indication.

13. The device of claim 12, wherein the execution status of each of the one or more additional instances of the first standalone application comprises at least one of activation, deactivation, exit, and termination.

\* \* \* \* \*